United States Patent Office 3,426,017
Patented Feb. 4, 1969

3,426,017
SULFONYLUREA COMPOUNDS
Ernst Jucker, Ettingen, and Adolf Lindenmann and Erhard Schenker, Basel, Switzerland, assignors to Sandoz Ltd. (also known as Sandoz A.G.), Basel, Switzerland
No Drawing. Filed Oct. 25, 1966, Ser. No. 589,244
Claims priority, application Switzerland, Oct. 27, 1965, 14,814/65
U.S. Cl. 260—239.6    12 Claims
Int. Cl. C07d 41/02, 41/00

ABSTRACT OF THE DISCLOSURE

This invention is directed to heterocyclic sulphonylurea derivatives of the formula:

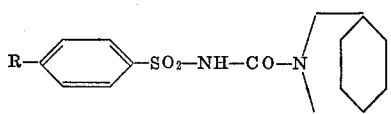

in which R signifies a hydrogen or halogen atom, an alkyl, alkoxy, alkylthio or acyl radical having from 1 to 4 carbon atoms or the nitro, amino or acetylamino radical, and their alkali metal alkaline earth metal, and ammonium salts. These compounds are useful in the treatment of diabetes mellitus.

---

The present invention relates to new sulphonylurea derivatives and a process for their production.

The present invention provides heterocyclic sulphonylurea derivatives of Formula I,

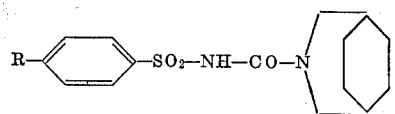

in which R signifies a hydrogen or halogen atom, an alkyl, alkoxy, alkylthio or acyl radical having from 1 to 4 carbon atoms, or the nitro, amino or acetylamino radical, and their alkali metal and alkaline earth metal and ammonium salts.

The present invention further provides a process for the production of compounds I and their alkali metal and alkaline earth metal and ammonium salts, characterized in that 3-azabicyclo-[3,2,2]nonane of Formula II

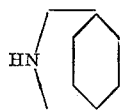

is reacted with a compound of Formula III,

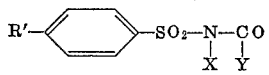

in which:

R' has the same significance as R except that it may not signify an amino radical, and either
X signifies a hydrogen atom and
Y signifies a lower alkoxy radical, or
X and Y together signify a second bond between the carbon and the nitrogen atom, and, when the compound of Formula I in which R signifies an acetylamino radical results, and the compound I in which R signifies an amino radical is desired, hydrolysis is effected, and when an alkali metal, alkaline earth metal or ammonium salt is required, salification is effected.

Examples of starting materials of Formula III are the lower alkyl esters, especially the methyl and ethyl esters, of a benzene-sulphonyl-carbamic acid.

When X and Y in Formula III signify a second bond between the carbon and nitrogen atom the starting materials used are the benzenesulphonyl isocyanates.

The process may, for example, be effected as follows depending on the starting material used:

A solution of 3-azabicyclo[3,2,2]nonane (if necessary an excess, up to one mol) and a benzenesulphonyl-carbamic acid ester, e.g. 4-chlorobenzene- and 4-acetylamino-benzenesulphonyl-carbamic acid ethyl ester, in an anhydrous organic solvent, e.g. absolute benzene, toluene, xylene, dimethyl formamide or acetonitrile, is heated to the boil at reflux for 1 to 6 hours. After removing the solvent, e.g. by distillation or filtration, the residue is dissolved in a suitable solvent, e.g. glycol monomethyl ether or glycol dimethyl ether, while heating. An addition compound of the compound of Formula I with 3-azabicyclo[3,2,2]nonane (Formula II) may in some cases crystallize on cooling. This addition compound which may optionally be purified by crystallization is split with a dilute mineral acid and subsequently purified by crystallization, whereby the desired final product of Formula I is obtained.

The formation of this addition compound may be avoided in that some glacial acetic acid is added to the reaction solution indicated above. In this case the final product may be isolated directly and purified by crystallization.

The reaction of compound II with compound III may also be effected without solvent, i.e. by melting.

When benzenesulphonyl isocyanates are used as the starting materials of Formula III, the benzenesulphonyl isocyanate is dissolved in an anhydrous organic solvent, e.g. absolute benzene or toluene, and 3-azabicyclo[3,2,2] nonane dissolved in the same solvent is slowly added at room temperature. The mixture is kept at 20–80° C. for ½ to 3 hours in order to complete the reaction and the final product is subsequently worked up in manner known per se.

The compound of Formula I, in which R signifies the amino radical, cannot be obtained in the manner described above, but may be obtained from the acetylamino compound produced by the preceding methods, by splitting off the acetyl radical by hydrolysis, preferably with an aqueous alkali.

The compounds of the invention are solid, crystalline compounds at room temperature; with ammonia or an alkali they form crystalline salts which are stable at room temperature.

The hitherto unknown heterocyclic sulphonylurea derivatives produced in accordance with the present invention have valuable pharmacodynamic properties. Thus, in tests effected with animals (rats, dogs) they exhibits a marked blood surgar lowering effect of long duration, which occurs even upon administration of low doses. Furthermore, the compounds are well tolerated and have a low toxicity in comparison with their effectiveness.

The compounds of the invention are therefore indicated for use in the treatment of Diabetes mellitus, in which case they are preferably administered per os in a daily dose of 100 to 1000 mg.

In order to produce suitable medicinal preparations the compounds are worked up with the usual organic or inorganic adjuvants which are inert and physiologically acceptable. Suitable medicinal preparations are, for example, tablets, dragées, capsules, syrups, injectable solutions. The preparations may contain adjuvants, e.g. polyvinyl pyrrolidone, methyl cellulose, talcum, magnesium stearate, stearic acid and sorbic acid, and suitable preserving agents, sweetening and colouring substances and flavourings.

Examples of a galenical preparation (tablets):

| | G. |
|---|---|
| N-(4-chlorobenzenesulphonyl) - 3 - azabicyclo[3,2,2]nonane - 3 - carboxamide (compound of Example 1) | 0.100 |
| Magnesium stearate | 0.0010 |
| Polyvinyl pyrrolidone | 0.0040 |
| Talcum | 0.0050 |
| Maize starch | 0.010 |
| Lactose | 0.038 |
| Dimethyl silicone oil | 0.0005 |
| Polyethylene glycol—6000 | 0.0015 |
| Total for a tablet of | 0.160 |

The term "in manner known per se" as used herein designates methods in use or described in the literature on the subject.

In the following non-limitative examples all temperatures are indicated in degree centigrade and are uncorrected.

Example 1.—N-(4-chlorobenzenesulphonyl)-3-azabicyclo[3,2,2]nonane-3-carboxamide

A solution of 25.0 g. of 3-azabicyclo[3,2,2]nonane and 26.4 g. of 4-chlorobenzenesulphonyl-carbamic acid ethyl ester in 130 ml. of absolute benzene is heated to 75–80° whilst stirring for 5 hours. The benzene is subsequently completely distilled off at 15 mm. of Hg and the yellow oil obtained as residue is dissolved in 1,2-dimethoxy-ethane whilst heating, whereupon the addition compound of N - (4-chlorobenzenesulphonyl)-3-azabicyclo[3,2,2]nonane-3-carboxamide and 3-azabicyclo[3,2,2] nonane is obtained in crystalline form when the solution cools. Melting point 194–196° (decomposition) from 1,2-dimethoxyethane.

This addition compound is split by dissolving it in a small amount of water and acidifying the solution with concentrated hydrochloric acid, whereupon N-(4-chlorobenzenesulphonyl) - 3 - azabicyclo[3,2,2]nonane-3 - carboxamide precipitates. Melting point 153–156° (decomposition) from carbon tetrachloride.

Sodium salt.—10.0 g. of N-(4-chlorobenzenesulphonyl)-3-azabicyclo[3,2,2]nonane-3-carboxamide are dissolved in 200 ml. of absolute ethanol whilst heating slightly. A solution of 1.35 g. of sodium hydroxide in 100 ml. of absolute ethanol is added to this solution whilst heating slightly (25°). After standing for about two hours the precipitated sodium salt is filtered off, washed 4 times, each time with 100 ml. of absolute ethanol-ether (1:1) and dried in a high vacuum over phosphorus pentoxide.

Example 2.—N-benzenesulphonyl-3-azabicyclo[3,2,2]nonane-3-carboxamide

A suspension of 22.9 g. of benzenesulphonyl-carbamic acid ethyl ester and 12.5 g. of 3-azabicyclo[3,2,2]nonane in 250 ml. of benzene is stirred at room temperature for 15 minutes. The resulting addition compound of benzenesulphonyl-carbamic acid ethyl ester and 3-azabicyclo[3,2,2]nonane (melting point 139–141°) is filtered off, dried and melted in the usual vacuum at 150° for 20 minutes. The compound indicated in the heading is recrystallized from ethylene chloride and has a melting point of 195–197° (decomposition).

The following compounds may be obtained in an analogous manner:

Example 3.—N-(4-toluenesulphonyl)3-azabicyclo[3,2,2]nonane-3-carboxamide

This compound is produced from 24.3 g. of 4-toluenesulphonyl-carbamic acid ethyl ester and 12.5 g. of 3-azabicyclo[3,2,2]nonane. Melting point 150–152° (decomposition) (from carbon tetrachloride).

Example 4.—N-(4-methylthiobenzenesulphonyl)-3-azabicyclo[3,2,2]nonane-3-carboxamide This compound is produced from 6.3 g. of 3-azabicyclo[3,2,2]nonane and 13.7 g. of 4-methylthiobenzenesulphonyl-carbamic acid ethyl ester. Melting point 134–136° (decomposition) (from carbon tetrachloride).

Example 5.—N-(4-acetylaminobenzenesulphonyl)3-azabicyclo[3,2,2]nonane-3-carboxamide This compound is produced from 44.0 g. of 3-azabicyclo[3,2,2]nonane and 100.0 g. of 4-acetylaminobenzenesulphonyl-carbamic acid ethyl ester. Melting point 237–239° (decomposition) (from acetonitrile).

Example 6.—N-(4-bromobenzenesulphonyl)-3-azabicyclo[3,2,2]nonane-3-carboxamide

A solution of 30.8 fl. of 4-bromobenzenesulphonyl-carbamic acid ethyl ester (melting point 86–88°) and 25.0 g. of 3-azabicyclo[3,2,2]nonane in 100 ml. of toluene is heated to the boil at reflux whilst stirring for 3 hours. The material which precipitates on cooling is filtered off, the crude product is divided between ethyl acetate and 5% hydrochloric acid. The ethyl acetate phase is washed with water until neutral, is dried over sodium sulphate, filtered and concentrated to an oil. The oil is crystallized from ether. The crude compound is recrystallized from benzene and has a melting point of 127–130°.

The following compound is obtained in an analogous manner:

Example 7.—N-(4-ethylbenzenesulphonyl)-3-azabicyclo[3,2,2]nonane-3-carboxamide

This compound is produced from 25.7 g. of 4-ethylbenzenesulphonyl-carbamic acid ethyl ester (melting point 50–54°) and 25.0 g. of 3-azabicyclo[3,2,2]nonane. Melting point 137–140° (decomposition) (from ether and benzene).

Example 8.—N-(4-nitrobenzenesulphonyl)-3-azabicyclo[3,2,2]nonane-3-carboxamide

A solution of 27.4 g. of 4-nitrobenzenesulphonyl-carbamic acid ethyl ester (melting point 133–134°) and 25.0 g. of 3-azabicyclo[3,2,2]nonane in 150 ml. of toluene is heated to the boil at reflux whilst stirring for 3 hours. The crude product which precipitates when the reaction solution cools is filtered off. The crude material is dissolved in chloroform and the solution extracted with 5% hydrochloric acid. The chloroform phase is washed with water until neutral, dried over sodium sulphate and concentrated to an oil. The oil is crystallized from ether. The compound indicated in the heading is recrystallized from acetonitrile and has a melting point of 200–203° (decomposition).

Example 9.—N-(4-methoxybenzenesulphonyl)-3-azabicyclo[3,2,2]nonane-3-carboxamide A solution of 25.9 g. of 4-methoxybenzenesulphonyl-carbamic acid ethyl ester (melting point 117–118°) and 25.0 g. of 4-azabicyclo[3,2,2]nonane in 250 ml. of toluene is heated to the boil at reflux whilst stirring for 5 hours. The hot solution is concentrated to an oil in the usual vacuum, the resulting residue is dissolved in ethylene chloride and the solution extracted with 5% aqueous hydrochloric acid. The ethylene chloride phase is washed with water until neutral, dried over sodium sulphate, filtered and concentrated to an oil. The oily residue is crystallized from ether and recrystallized from carbon tetrachloride. The compound indicated in the heading has a melting point of 159–161° (decomposition).

Example 10.—N-(4-acetylbenzenesulphonyl)-3-azabicyclo[3,2,2]nonane-3-carboxamide A solution of 13.6 g. of 4-acetylbenzenesulphonyl-carbamic acid ethyl ester and 12.5 g. of 3-azabicyclo[3,2,2]nonane in 100 ml. of toluene is heated to the boil at reflux whilst stirring for 3½ hours. The solution is evaporated in a vacuum, the residue divided between benzene and 2 N hydrochloric acid. The benzene portion is washed with water until neutral, dried over sodium sulphate and concentrated to a crystalline residue. The compound mentioned in the heading is recrystallized from benzene and has a melting point of 155–157° (decomposition).

Example 11.—N-(4-aminobenzenesulphonyl)-3-azabicyclo[3,2,2]nonane-3-carboxamide

A solution of 12.5 g. of N-(4-acetylaminobenzenesulphonyl)-3-azabicyclo[3,2,2]nonane-3-carboxamide and 4.9 g. of sodium hydroxide in 200 ml. of water is heated to the boil at reflux whilst stirring for 3 hours. The reaction solution is cooled, is made weakly acid with 10% aqueous hydrochloric acid and the precipitated material is filtered off. The resulting crude product is dried and recrystallized from ethylene chloride. The compound indicated in the heading has a melting point of 187–190° (decomposition).

Example 12.—N-(4-toluenesulphonyl)-3-azabicyclo[3,2,2]nonane-3-carboxamide 7.0 g. of 4-toluenesulphonyl isocyanate in 24 ml. of toluene are added portionwise in the absence of moisture to a solution of 5.0 g. of 3-azabicyclo[3,2,2]nonane in 10 ml. of toluene. After heating the reaction mixture for a short time on a water bath, it is evaporated to dryness in a vacuum. The crystalline residue is crystallized from carbon tetrachloride and after recrystallizing once from the same solvent the compound indicated in the heading, having a melting point of 150–152° (decomposition), is obtained.

What is claimed is:

1. A compound selected from the group consisting of a compound of the formula:

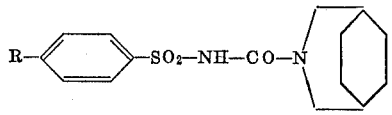

in which R is hydrogen, chlorine, or bromine, alkyl, alkoxy, or alkylthio, each of 1 to 4 carbon atoms, acetyl, nitro, amino or acetylamino, and physiologically acceptable alkali metal, alkaline earth metal and ammonium salts thereof.

2. A compound according to claim 1, in which the compound is N-(4-chlorobenzenesulphonyl)-3-azabicyclo[3,2,2]nonane-3-carboxamide.

3. A compound according to claim 1, in which the compound is N-benzenesulphonyl-3-azabicyclo[3,2,2]nonane-3-carboxamide.

4. A compound according to claim 1, in which the compound is N-(4-toluenesulphonyl)-3-azabicyclo[3,2,2]nonane-3-carboxamide.

5. A compound according to claim 1, in which the compound is N-(4-methylthiobenzenesulphonyl)-3-azabicyclo[3,2,2]nonane-3-carboxamide.

6. A compound according to claim 1, in which the compound is N-(4-acetylaminobenzenesulphonyl)-3-azabicyclo[3,2,2]nonane-3-carboxamide.

7. A compound according to claim 1, in which the compound is N-(4-bromobenzenesulphonyl)-3-azabicyclo[3,2,2]nonane-3-carboxamide.

8. A compound according to claim 1, in which the compound is N-(4-ethylbenzenesulphonyl)-3-azabicyclo[3,2,2]nonane-3-carboxamide.

9. A compound according to claim 1, in which the compound is N-(4-nitrobenzenesulphonyl)-3-azabicyclo[3,2,2]nonane-3-carboxamide.

10. A compound according to claim 1, in which the compound is N-(4-methoxybenzenesulphonyl)-3-azabicyclo[3,2,2]nonane-3-carboxamide.

11. A compound according to claim 1, in which the compound is N-(4-acetylbenzenesulphonyl)-3-azabicyclo[3,2,2]nonane-3-carboxamide.

12. A compound according to claim 1, in which the compound is N-(4-aminobenzenesulphonyl)-3-azabicyclo[3,2,2]nonane-3-carboxamide.

References Cited

FOREIGN PATENTS 6,410,217   3/1965   Netherlands.

HENRY R. JILES, *Primary Examiner.*

C. M. SHURKO, *Assistant Examiner.*

U.S. Cl. X.R.

260—239, 397.7, 453, 470; 424—229, 244